Nov. 22, 1955   R. F. ROBERSON   2,724,315
PLOW TRIPPING MECHANISM
Filed Dec. 21, 1953   2 Sheets-Sheet 1

INVENTOR
RAYMOND F. ROBERSON

Paul O. Pippel
ATTORNEY

Nov. 22, 1955 — R. F. ROBERSON — 2,724,315
PLOW TRIPPING MECHANISM
Filed Dec. 21, 1953 — 2 Sheets-Sheet 2

INVENTOR
RAYMOND F. ROBERSON

ATTORNEY

United States Patent Office 2,724,315
Patented Nov. 22, 1955

2,724,315

PLOW TRIPPING MECHANISM

Raymond F. Roberson, Canton, Ill., assignor to International Harvester Company, a corporation of New Jersey Application December 21, 1953, Serial No. 399,279

4 Claims. (Cl. 97—47.85)

This invention relates to agricultural implements and particularly to plows. More specifically the invention concerns a direct connected moldboard plow and tripping means therefor to avoid injury to the earthworking tools in operation. The implement with which this invention is concerned is particularly adapted for attachment to a tractor equipped with an implement attaching structure by which the implement may be quickly and integrally connected thereto to be carried thereby in transport. Specifically, the implement attachment of this invention is designed for connection to a tractor equipped with the so-called 2-point hitch or implement attaching structure.

A plow bottom or the like is subject to damage during operation by encountering obstructions such as stumps and stones as well as unusually hard soil conditions. The principal object of the present invention, therefore, is the provision of improved tripping mechanism for the earthworking tools of an agricultural implement.

Another object of the invention is the provision in a tractor connected agricultural implement, such as a plow, of improved tripping mechanism for the earth-working tools by which they are swung out of the way when obstructions are encountered, wherein the earth-working tools are readily returned to their operating position by the weight of the tools themselves.

Another object of the invention is the provision in a tractor mounted plow including a hitch frame integrally connectable to attaching mechanism on a tractor, of means for tripping the tool-carrying frame relative to the hitch frame with which it is associated.

Other objects and advantages of the invention will become clear from the following detailed description when read in conjunction with the accompanying drawings, wherein.

Figure 1:
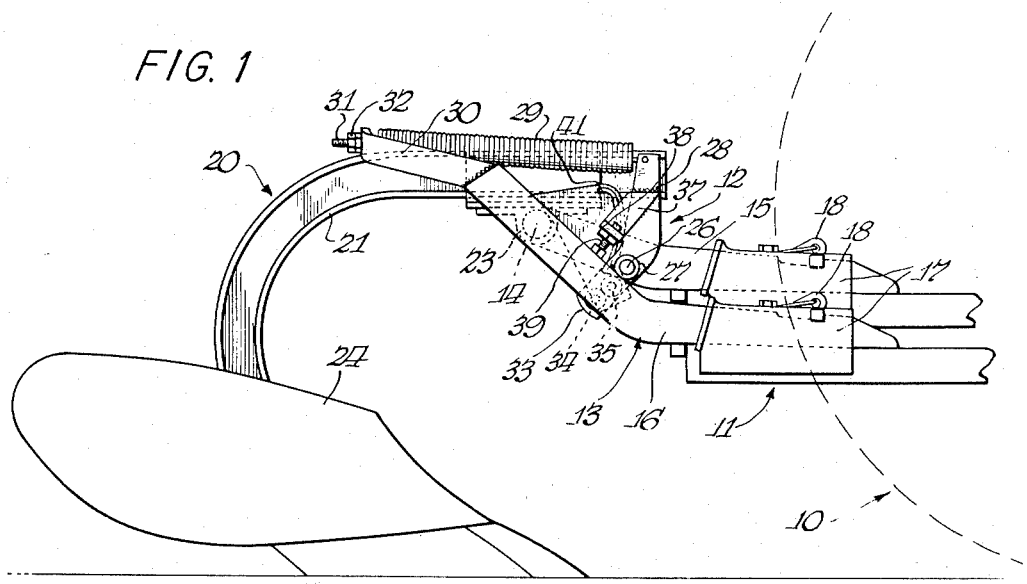
Fig. 1 is a view, in side elevation, of an implement embodying the features of this invention integrally connected to a tractor designated by the numeral 10, having incorporated therewith a 2-point implement attaching structure 11, only a portion of which is shown.

Referring particularly to the drawings, it will be noted that the implement with which the present invention is concerned is a one-bottom moldboard plow designated generally by the numeral 12 and is adapted for integral mounting upon the tractor 10.

The implement 12 comprises a hitch frame 13 which is generally U-shaped and includes a rear transverse shaft 14, and laterally spaced forwardly extending arms 15 and 16 which function as elongated shafts, the forward ends of which are receivable in laterally spaced sockets 17 forming a part of the tractor attaching structure 11. The shafts 15 and 16 are locked in the respective sockets 17 by latch mechanism 18 cooperating with grooves 19 provided in the shafts. The implement attaching structure 11 may be raised and lowered with respect to the tractor, carrying the implement 12 therewith and forming a unit between the tractor and implement. Further description of the implement attaching structure 11 on the tractor may be had by reference to a co-pending U. S. application Serial 338,651, filed February 25, 1953.

Figure 2:
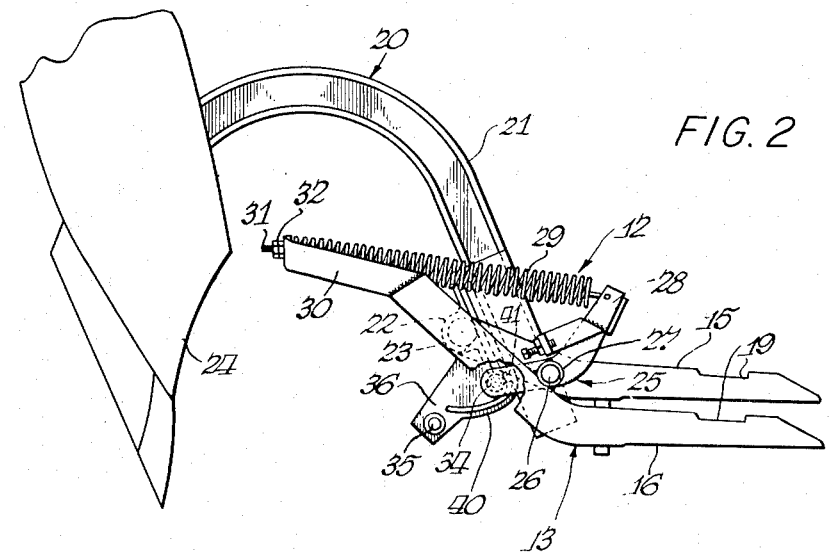
Fig. 2 is a view similar to Fig. 1, less the implement attaching structure of the tractor, and showing the tool-carrying frame of the implement in tripped position relative to its hitch mechanism.
Figure 3:
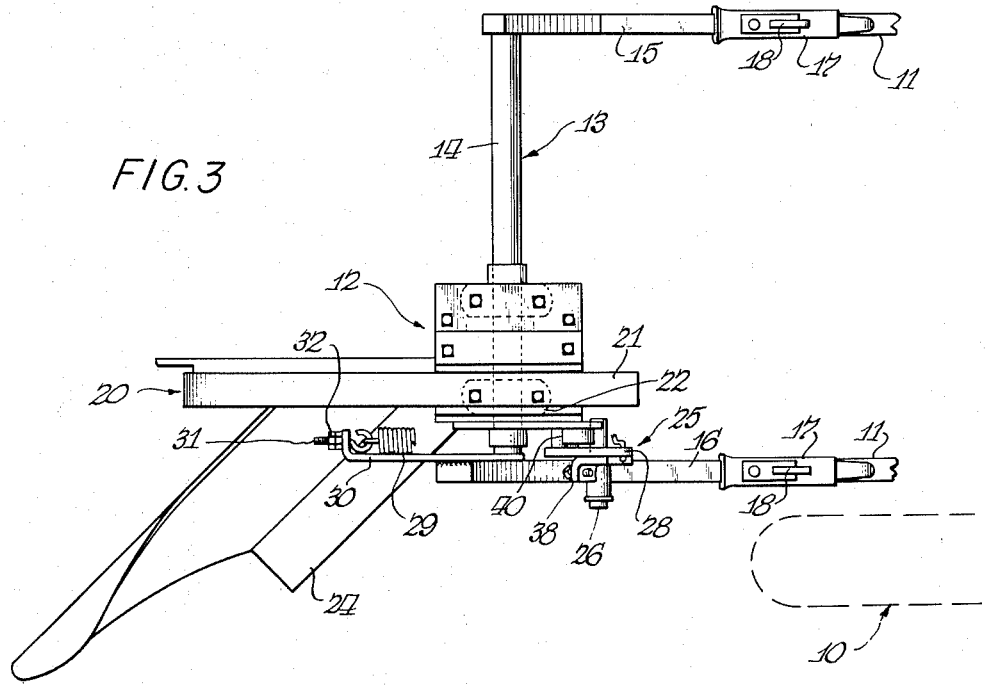
Fig. 3 is a plan view of the structure shown in Fig. 1.
Figure 4:
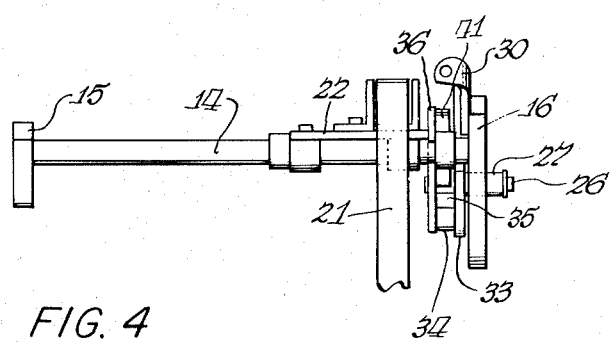
Fig. 4 is a rear elevation, with parts removed, of a portion of the structure shown in Fig. 3.

The implement hitch frame 13 has mounted thereupon a tool-carrying frame 20 which comprises a longitudinally extending tool beam 21 which is pivotally mounted upon the transverse shaft 14 near its right end by clamping means 22 affixed to the tool beam 21 and including a bearing 23 for the reception of the shaft 14, whereby the tool-supporting frame 20 is vertically swingable about the shaft 14 as an axis from an operating position, such as indicated in Fig. 1, to the tripped position of Fig. 2. The rear end of the tool beam 21 curves downwardly and forwardly and has secured to its lower end a plow bottom 24.

The plow is held in its operating position and is tripped by mechanism which includes a bellcrank 25 fulcrumed upon a pivot pin 26 carried in a bearing 27 fixed to the right-hand shaft member 16 of the implement hitch structure 13. Bellcrank 25 has an arm 28 to which is connected one end of a spring 29, the other end of which is adjustably anchored to an extension 30 fixed, as by welding, to the upper end of the shaft member 16. Tension on the spring is adjustable by means of a hook bolt 31 and nuts 32 by which the rear end of the spring is connected to the bracket bar extension 30.

The other arm 33 of the bellcrank has mounted thereon and projecting laterally therefrom a roller 34 engageable with a roller 35 fixed to a guide plate 36 secured to the beam 21 near its forward end, and projecting downwardly therefrom. In the position of the parts indicated in Fig. 1, it will be observed that when excess draft is encountered by the plow bottom 24 it tends to swing upwardly in a clockwise direction about the axis of the shaft 14 upon which it is mounted. This exerts force downwardly through the roller 35 in an arc about the axis of the shaft 14, and it will be noted that in the operating position of Fig. 1 the roller 35 is slightly over-center with respect to a line drawn through the roller 33 and the pivot 26 of the bellcrank. The roller 35 thus rocks the bellcrank 25 clockwise, as viewed in Figs. 1 and 2, against the action of the spring 29. The ease or difficulty with which the tool frame 20 is tripped relative to the hitch frame 13 may be regulated by adjusting the relative positions of the rollers 33 and 35. This is accomplished by adjustable stop means including a lug 37 affixed to and depending from the arm 28 of the bellcrank 25 and having a laterally bent portion 38 apertured to receive a threaded bolt 39 engageable with the upper edge of arm or shaft 16 to limit the rocking of the bellcrank 25 in one direction, and adjustable to rock the bellcrank relative to the roller 35.

When the tool frame 20 is tripped completely it reaches the position indicated in Fig. 2. After the roller 35 has passed the roller 34, the roller 34 engages a guide member in the form of a cam 40 which is arcuately curved and provided at its upper end with a hook portion 41. After passing the roller 35 the roller 34 engages the inner surface of the camming member 40 and rides up the surface thereof against the action of the spring 29 until the hook portion 41 is reached. This hook 41 serves as a stop to limit the swinging movement of the tool frame 20 relative to the hitch frame 13.

When the obstruction which caused the tripping of the tool frame has been passed, it returns of its own weight, assisted by the spring 29, to the operating position of Fig. 1.

From the foregoing it should be clear that a novel tripping mechanism for an integral plow has been devised and described herein. However, the invention has been described in its preferred embodiment, and it should be understood that modifications may be made therein without departing from the spirit of the invention or the scope of the appended claims.

What is claimed is:

1. Tripping mechanism for a tractor mounted implement including a hitch frame having connecting elements thereon integrally connectable with attaching mechanism on the tractor and a tool-carrying frame mounted on the hitch frame, comprising pivot means connecting the tool frame to the implement hitch frame for swinging movement relative thereto about a transverse horizontal axis, means for yieldably holding the tool frame against upward swinging about said pivot in response to excess draft on the tool comprising means serving as a bellcrank fulcrumed on the hitch frame, spring means yieldably connecting one arm of said bellcrank to the hitch frame to resist rocking thereof in one direction, a cam roller carried by the other arm of the bellcrank, actuating means carried by the tool frame including a tripping roller between the cam roller and said fulcrum movable from an initial position with the tripping roller in engagement with the cam roller and in over-center relation therewith and with the fulcrum to a tripped position with the tripping roller out of engagement with the cam roller upon upward movement of the tool frame about its pivot to an inoperative position.

2. Tripping mechanism for a tractor mounted implement including a hitch frame having connecting elements thereon integrally connectable with attaching mechanism on the tractor and a tool-carrying frame mounted on the hitch frame, comprising pivot means connecting the tool frame to the implement hitch frame for swinging movement relative thereto about a transverse horizontal axis, means for yieldably holding the tool frame against upward swinging about said pivot in response to excess draft on the tool comprising means serving as a bellcrank fulcrumed on the hitch frame, spring means yieldably connecting one arm of said bellcrank to the hitch frame to resist rocking thereof in one direction, a cam roller carried by the other arm of the bellcrank, actuating means carried by the tool frame including a tripping roller between the cam roller and said fulcrum movable from an initial position with the tripping roller in engagement with the cam roller and in over-center relation therewith and with the fulcrum to a tripped position with the tripping roller out of engagement with the cam roller upon upward movement of the tool frame about its pivot to an inoperative position, and a cam member mounted on the tool frame engageable with the cam roller during upward movement of the tool frame to rock the bellcrank and increase the tension on the spring.

3. Tripping mechanism for a tractor mounted implement including a hitch frame having connecting elements thereon integrally connectable with attaching mechanism on the tractor and a tool-carrying frame mounted on the hitch frame, comprising pivot means connecting the tool frame to the implement hitch frame for swinging movement relative thereto about a transverse horizontal axis, means for yieldably holding the tool frame against upward swinging about said pivot in response to excess draft on the tool comprising means serving as a bellcrank fulcrumed on the hitch frame, spring means yieldably connecting one arm of said bellcrank to the hitch frame to resist rocking thereof in one direction, a cam roller carried by the other arm of the bellcrank, actuating means carried by the tool frame including a tripping roller between the cam roller and said fulcrum movable from an initial position with the tripping roller in engagement with the cam roller in over-center relation therewith and with the fulcrum to a tripped position with the tripping roller out of engagement with the cam roller upon upward movement of the tool frame about its pivot to an inoperative position, a cam member mounted on the tool frame engageable with the cam roller during upward movement of the tool frame to rock the bellcrank and increase the tension on the spring, and a stop on said cam member engageable with the cam roller to limit the upward swinging of the tool frame about its pivot.

4. The invention set forth in claim 3, wherein an adjustable stop member is provided on the bellcrank and engageable with the hitch frame to limit the rocking of the bellcrank in one direction, said stop being adjustable to rock the bellcrank and vary the rollers to the fulcrum, whereby the draft force required to trip the tool frame may be varied.

References Cited in the file of this patent

UNITED STATES PATENTS

| | | |
|---|---|---|
| 256,356 | Morter | Apr. 11, 1882 |
| 372,206 | Damerell | Oct. 25, 1887 |
| 617,711 | Beall | Jan. 17, 1889 |
| 1,020,908 | Johnson | Mar. 19, 1912 |
| 1,594,106 | Mouchet | July 27, 1926 |
| 2,331,686 | Hintz, Jr. | Oct. 12, 1943 |
| 2,567,738 | Silver et al. | Sept. 11, 1951 |
| 2,701,510 | Altgelt | Feb. 8, 1955 |